United States Patent [19]

Singer

[11] 4,177,159
[45] Dec. 4, 1979

[54] CATALYTIC DRY POWDER MATERIAL FOR FUEL CELL ELECTRODES COMPRISING FLUOROCARBON POLYMER AND PRECATALYZED CARBON

[75] Inventor: Roger M. Singer, West Hartford, Conn.

[73] Assignee: United Technologies Corporation, Hartford, Conn.

[21] Appl. No.: 920,035

[22] Filed: Jun. 28, 1978

[51] Int. Cl.$^2$ .................. B01J 31/02; H01M 4/04; H01M 4/96
[52] U.S. Cl. .................. 252/428; 260/42.22; 260/42.27; 252/182.1; 252/425.3; 252/430; 427/115; 427/122; 429/42; 528/502
[58] Field of Search .................. 252/425.3, 428, 430, 252/182.1; 429/42; 427/115; 260/42.22, 42.27; 528/502

[56] References Cited

U.S. PATENT DOCUMENTS

| | | | |
|---|---|---|---|
| 2,479,451 | 8/1949 | Young et al. | 252/428 |
| 2,961,712 | 11/1960 | Davis | 260/42.27 |
| 3,080,258 | 3/1963 | Davis | 260/42.27 |
| 3,440,107 | 4/1969 | Barber | 252/425.3 |
| 3,528,955 | 9/1970 | Lippman | 528/502 |
| 3,857,737 | 12/1974 | Kemp et al. | 252/182.1 |
| 4,031,033 | 6/1977 | Budenski et al. | 252/425.3 |
| 4,043,933 | 8/1977 | Breault | 429/42 |
| 4,044,193 | 8/1977 | Petrow et al. | 429/42 |

FOREIGN PATENT DOCUMENTS 1163479 9/1969 United Kingdom .................. 429/42

Primary Examiner—P. E. Konopka
Attorney, Agent, or Firm—Stephen E. Revis

[57] ABSTRACT

A novel powder particularly suitable for forming the catalyst layer in the manufacture of electrochemical cell electrodes comprises a high molecular weight fluorocarbon polymer and precatalyzed carbon. The maximum size of the particles is about five microns and the polymer has a molecular weight of at least one million.

5 Claims, 1 Drawing Figure

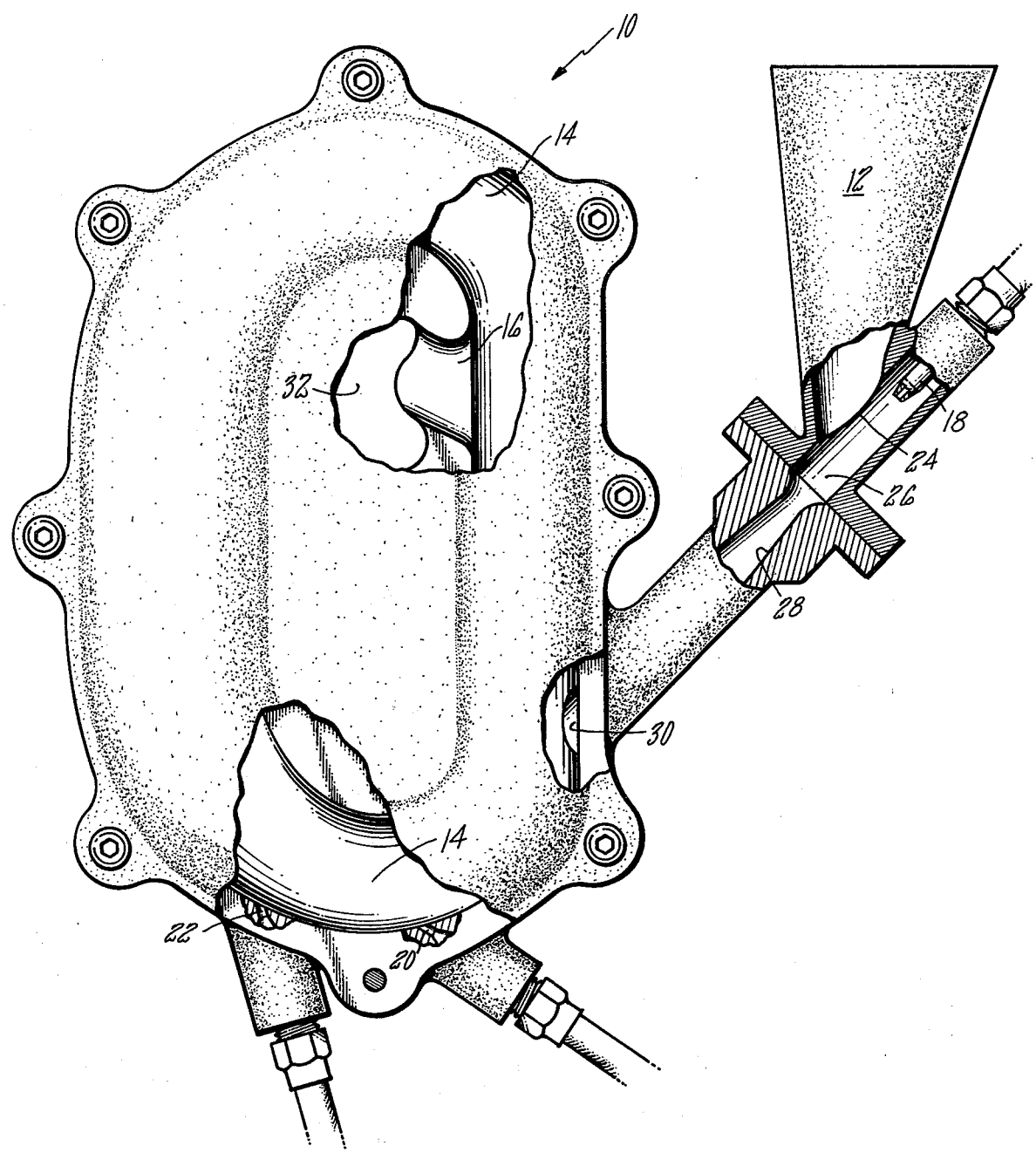

CATALYTIC DRY POWDER MATERIAL FOR FUEL CELL ELECTRODES COMPRISING FLUOROCARBON POLYMER AND PRECATALYZED CARBON

BACKGROUND OF THE INVENTION

1. Field of the Invention

This invention relates to fluorinated hydrocarbon polymers and in particular to polytetrafluoroethylene (PTFE).

2. Description of the Prior Art

Electrodes for use in electrochemical cells such as fuel cells are well known in the art. One common type of electrode is the gas diffusion electrode. A pair of gas diffusion electrodes are disposed on either side of a compartment containing a matrix which is soaked with electrolyte. Catalyst is disposed on the electrolyte facing surface of each electrode. Hydrogen is fed to the back side of one electrode while oxygen or air is fed to the back side of the other electrode. The gases enter the electrodes and react with the electrolyte in the presence of the catalyst.

One type of gas diffusion electrode comprises a layer of PTFE combined with a catalyst supported on carbon particles (i.e., catalyzed carbon), the layer being disposed on the surface of a porous carbon substrate (e.g., carbon paper). The PTFE (or any other compatible hydrophobic polymer) prevents the electrolyte from filling up the electrode to such an extent that sufficient fuel or oxidant cannot reach the catalyst. A gas diffusion electrode of this type is described in column 5 of commonly owned U.S. Pat. No. 3,857,737 to Kemp et al.

In order to obtain good performance from the fuel cell it is critical that the PTFE and the catalyzed carbon be intimately mixed, highly dispersed, and uniformly distributed throughout the PTFE/catalyst layer. One technique for applying such a layer to a substrate is the direct filtration method. In that method catalyzed carbon powder and an aqueous PTFE dispersion containing colloidal size PTFE particles are blended into an alcohol/water solution to form a co-suspension of carbon and PTFE therein. The suspension is caused to floc, such as by heating or adding a floccing agent. Floccing is the coalescence of the catalyzed or uncatalyzed carbon particles with the PTFE particles. After floccing, excess liquid is decanted and the floc is applied to the surface of a carbon paper substrate which acts as a filter. Liquids pass through the substrate and a layer of the desired solids mixture (i.e., the floc) remains on the surface of the substrate. The article is dried, compacted, and sintered. The resulting layer has all the requisite properties discussed above, and electrodes may be made by this method which perform very well.

The foregoing technique and other known techniques for forming good electrodes are slow, expensive, and not suitable for production runs wherein hundreds and thousands of electrodes must be made in a relatively short period of time at minimal cost.

SUMMARY OF THE INVENTION

An object of the present invention is a novel powder including precatalyzed carbon and a hydrophobic fluorocarbon polymer which is particularly useful in high speed dry fabrication processes for making fuel cell electrodes.

The present invention is a finely divided powder comprising precatalyzed carbon and a high molecular weight hydrophobic fluorocarbon polymer. More particularly, the maximum particle size of the powder is on the order of about five microns, and the polymer in the powder of the present invention has a molecular weight of at least $10^6$.

According to one embodiment of the present invention the powder particles are floc particles of precatalyzed carbon and a hydrophobic fluorocarbon polymer.

In the specification and claims a "floc particle" is an agglomerate comprising both carbon particles and polymer particles in a fixed relationship to each other as determined by the floccing process.

In another embodiment of the present invention the powder is a mechanical mixture of individual hydrophobic fluorocarbon polymer particles and individual precatalyzed carbon particles.

The powder of the present invention is particularly suitable for applying dry to the surface of a substrate in the manufacture of electrodes for electrochemical cells. The high molecular weight of the fluorocarbon polymer and the small particle size of the powder are critical factors in the manufacture of electrodes with characteristics which at least approach the characteristics of the better electrodes made by the more expensive prior art wet processes. PTFE is the preferred fluorocarbon polymer.

Prior to the present invention a dry fluorocarbon polymer powder comprising a high molecular weight and very small particle size was not available and it was not known how such a powder could be made. Commercially available fine particle size fluorocarbon polymer dry powders did not have sufficiently high molecular weight. Dry high molecular weight (i.e., greater than one million) fluorocarbon polymers which were commercially available had particles which were too large, and it was not known how to reduce the size of these particles to the very small size desired without damaging the polymer. Fluorocarbon polymers having both high molecular weight and fine particle size were available only in aqueous suspensions; and, although it is possible to floc a co-suspension of precatalyzed carbon and this polymer, dry the floc, and form a powder made up of agglomerates of carbon and polymer, it was not known how to reduce the particle agglomerates to a very small particle size. One reason for the inability to make very small dry floc agglomerates was the highly tacky nature of the agglomerates whereby reagglomeration into larger particle size occurred faster than the machines could pulverize the material.

Commonly owned, copending U.S. Patent application Ser. No. 920,036 titled "Dry Floc Method For Making An Electrochemical Cell Electrode" by G. Goller and J. Salonia and commonly owned, copending U.S. Patent application Ser. No. 920,037 titled "Dry Mix Method For Making An Electrochemical Cell Electrode" by G. Goller, V. Petraglia, and J. Salonia, both filed on even date herewith describe dry electrode fabrication procedures which can use the novel powder of the present invention. The powder of the present invention results in improved electrodes when compared to electrodes made by these same dry processes but using other powders. The electrode fabrication procedures of these copending applications will be discussed in somewhat more detail in the description of the preferred embodiments.

BRIEF DESCRIPTION OF THE DRAWING

The sole FIGURE is a plan view, partially broken away, showing apparatus which may be used in the manufacture of the powder of the present invention.

DESCRIPTION OF THE PREFERRED EMBODIMENTS

In one exemplary embodiment of the present invention the novel powder is a mechanical mixture of polytetrafluoroethylene (PTFE) particles having a molecular weight of $1.0 \times 10^6$ and carbon particles precatalyzed with platinum. Starting materials for making this powder are TFE-6 polytetrafluoroethylene powder manufactured by Dupont and precatalyzed carbon powder. TFE-6 has a molecular weight of about $1 \times 10^6$ and particles which are on the order of 100 microns in size. The precatalyzed carbon powder may be made by any known method such as that described in U.S. Pat. No. 3,440,107 to Barber or U.S. Pat. No. 4,044,193 to Prototech Inc., and is commercially available.

The precatalyzed carbon powder and the TFE-6 powder are mechanically mixed together in a non-grinding type blender until a fairly uniform distribution of the particles is obtained. When this material is to be used as a fuel cell catalyst layer the ratio, by weight, of PTFE to catalyzed carbon may be as low as 30:70 and at least as high as 50:50.

The next step is to reduce the particle size of the mixture to on the order of about five microns or less. The smaller the particle size the better.

To accomplish this the mixture is put through a Jet-O-Mizer which is a fluid energy mill manufactured by Fluid Energy Processing and Equipment Company of Hatfield, Pennsylvania. We use a "laboratory" size Jet-O-Mizer model 0202-C6S. Note that the catalyzed carbon particle size may already be suitably small such that this step is only for the purpose of reducing the PTFE particle size.

A fluid energy mill of the type referred to above is shown in the drawing. The mill, in general, is represented by the reference numeral 10. It comprises a feed hopper 12, a toroidal-like reduction chamber 14, a reduction chamber outlet 16, a pusher nozzle 18, and grinding nozzles 20, 22.

The material to be ground is placed in the feed hopper 12. The pusher nozzle 18 blows a stream of air or nitrogen past the hopper outlet 24 creating a low pressure area 26 in the channel 28. The material in the hopper 12 is thereby drawn into the channel 28 and blown from the outlet 30 of the channel 28 into the reduction chamber 14.

The grinding nozzles 20, 22 inject air and/or nitrogen into the chamber 14 at sonic or supersonic velocities. The energy of the pressurized fluid is converted in velocity energy and the feed material entering the reduction chamber is entrained by the stream of circulating fluid. The violent jet action in the reduction chamber results in the particles impacting against each other and thereby breaking into smaller particles as they circulate. Centrifugal force shifts the larger, heavier particles toward the outer periphery of the chamber 14. At the outlet 16, part of the circulating fluid changes direction and flows out of the reduction chamber 14 into a chamber 32 which is connected to a duct whose axis extends perpendicular to the plane of the paper and which is attached to the opening 32 at the back side of the mill 10 which cannot be seen in the drawing. Entrained in this portion of the circulating fluid which leaves the chamber 14 are particles already fine enough to be diverted from their path by the viscous drag of the outgoing fluid. These particles comprise the material of the present invention and may be accumulated or used directly, the latter being preferred. The larger particles, due to inertia, continue to circulate for further grinding.

In the foregoing embodiment the material to be ground (i.e., the mixture of PTFE and catalyzed carbon) was placed in the hopper 12 and fed into the reduction chamber 14 at a rate of about 29 grams per minute. The air pressure to the pusher nozzle 18 was 20–50 psi and the pressure to the grinding nozzles 20, 22 was 40–60 psi. The temperature of the air from the nozzles 18, 20, 22 was about room temperature. It is estimated that the size of the particles leaving the mill is no greater than about five microns and the mean particle size is on the order of about one micron.

As heretofore discussed, prior to the present invention it was not possible to obtain, commercially, a dry, powdered, hydrophobic fluorocarbon polymer such as PTFE having, simultaneously, a high molecular weight (i.e., greater than $10^6$) and a very small particle size (i.e., less than about five microns). Furthermore, it was not known and it was not obvious how to manufacture such a material. It was not possible, for example, to use machines which ground material by mechanical working since PTFE fibrillates if worked to the extent necessary to reduce it to the desired very small particle size.

It is theorized that the success of being able to make the material of the present invention was not only the device such as the fluid energy mill 10 (which has no blades or other working parts to damage or cause fibrillation of the PTFE), but also the presence of the catalyzed carbon mixed with the PTFE which helps stabilize the reduced particle size. It is also theorized that contact (in the Jet-O-Mizer) between the PTFE particles and the relatively hard precatalyzed carbon particles helps break the PTFE particles into the desired small size particles.

In another embodiment of the present invention a floc comprised of catalyzed carbon and PTFE is dried and preliminarily reduced to a relatively coarse size in a device such as a Waring Blender. The floc may be made by the manner described in the Background of the Invention with regard to the direct filtration method for applying a PTFE/catalyst layer to a substrate. For example, catalyzed carbon powder and an aqueous PTFE dispersion containing colloidal size PTFE particles having the appropriate high molecular weight are blended into an alcohol/water solution to form a co-suspension of carbon and PTFE. The suspension is caused to floc by heating or adding a floccing agent. After floccing, excess liquid is decanted and the floc is then dried. A particularly suitable PTFE for use in forming the floc is TFE-30 manufactured by Dupont. TFE-30 is an aqueous dispersion of colloidal size PTFE particles having a molecular weight of $3.0 \times 10^6$. The floc particles (i.e., agglomerates), after they have been preliminarily ground as mentioned above, are introduced into the feed hopper 12 and reduced to the desired very small particle size by the same method (and under substantially similar conditions) as described above using the mechanical mixture of precatalyzed carbon and PTFE.

Note that the floc is not a mixture of separate PTFE particles and separate catalyzed carbon particles. The floc is made up of particles which are agglomerates of PTFE and catalyzed carbon. As with the first exemplary embodiment described above, prior to discovery of the method described herein, there was no known method for reducing the particle size of the floc agglomerates to an the order of five microns or less. The fluid energy mill described above effectively breaks up these agglomerates so that the agglomerates are less than above five microns in size.

Due to the tacky nature of the material, during storage the floc particles of the present invention tend to reagglomerate; that is, the very small agglomerates recombine to form larger agglomerates. It is therefore recommended that the floc powder of the present invention be used as soon as possible and preferably directly as it leaves the fluid energy mill 10. A similar type of problem may occur with the mechanical mixture of precatalyzed carbon and PTFE described in the first embodiment, but to a lesser extent.

Both of the embodiments described above utilize precatalyzed carbon and PTFE. The word "carbon" is intended to encompass carbon black, graphitized carbon black, and acetylene black, as well as other forms of carbon. Furthermore, the hydrophobic fluorocarbon polymer of the present invention is not intended to be limited to polytetrafluoroethylene although it is preferred. Any hydrophobic fluorocarbon polymer having the prerequisite molecular weight may be used in preparing the material of the present invention. The catalyst which is supported on the carbon is preferably platinum but also is not limited thereto.

As heretofore mentioned, the powder of the present invention is particularly useful in fabricating fuel cell electrodes in accordance with the methods described in the copending patent applications referred to in the Summary of the Invention. In both of these methods a carbon/polymer powder is dispersed as a cloud of particles in an enclosed chamber oven an electrode substrate to which the powder is to be applied. A vacuum is drawn under the substrate pulling the particles onto the substrate and forming a highly uniform layer of polymer and supported catalyst. After the appropriate amount of powder is applied to the substrate the layer is compacted and the article is then sintered to form the finished electrode. Although the processes of these copending applications have many advantages using a variety of powders, best results have been obtained using the powders of the present invention.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A finely divided dry powder having a maximum particle size of about five microns and a mean particle size of about one micron or less, said powder comprising precatalyzed carbon and polytetrafluoroethylene, the polytetrafluoroethylene having a molecular weight of at least $10^6$.

2. The finely divided powder according to claim 1 wherein said powder consists of floc particles formed by floccing a co-suspension of said precatalyzed carbon particles and polytetrafluoroethylene particles, drying the floc so formed, and reducing the floc to a powder having said maximum particle size.

3. The finely divided powder according to claim 1 wherein the powder consists of floc particles.

4. The finely divided powder according to claim 1 wherein said powder is a mechanical mixture of individual polytetrafluoroethylene particles and individual precatalyzed carbon particles.

5. The finely divided powder according to claim 4 wherein said powder is formed by mechanically mixing together precatalyzed carbon particles and polytetrafluoroethylene particles and subsequently reducing the particle size of said mixture to no greater than said maximum size in a fluid energy mill.

* * * * *